METHOD AND APPARATUS FOR CONTROLLING CATHODE RAY TUBE BRIGHTNESS AND CONTRAST

Filed Feb. 18, 1966

INVENTORS
ALEX W. DREYFOOS, JR.
GEORGE W. MERGENS

BY Curtis Ailes

ATTORNEY

United States Patent Office 3,471,740

Patented Oct. 7, 1969

3,471,740

METHOD AND APPARATUS FOR CONTROLLING CATHODE RAY TUBE BRIGHTNESS AND CONTRAST

Alex W. Dreyfoos, Jr., Port Chester, N.Y., and George W. Mergens, Wilton, Conn., assignors to Photo Electronics Corporation, Byram, Conn., a corporation of New York Filed Feb. 18, 1966, Ser. No. 528,516

Int. Cl. H01j 31/48

U.S. Cl. 315—10 16 Claims

Figure 1:
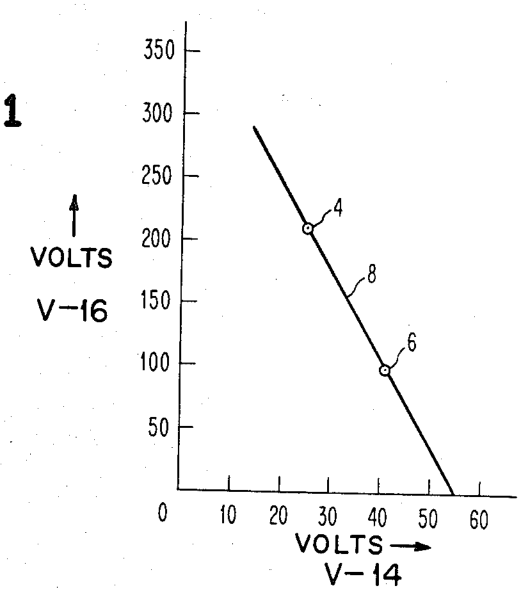

This invention relates to a method for controlling the brightness of a cathode ray tube of the type commonly used to display pictorial information in television receivers, and for controlling contrast in conjunction with the control of brightness. The invention more particularly relates to a method for controlling both brightness and contrast in which the contrast is maintained substantially constant even though the brightness drive is varied to compensate for changes in other operating parameters.

In the conventional operation of cathode ray picture tubes, the first and second grid electrodes are maintained at substantially constant voltage levels during the display of each picture frame, the voltage on the first (control) grid being reduced only between picture frames for blanking purposes. Both brightness and contrast are conventionally adjusted by adjusting the voltage on the cathode of the tube. In order to control brightness, the D.C. level of the cathode voltage is adjusted. In order to control contrast, the gain of the video amplifier is adjusted to make the light areas lighter and the dark areas darker, if greater contrast is desired. Unfortunately, with these conventional methods of controlling brightness and contrast, each is subject to variation in response to adjustment of the other. Thus, if brightness is adjusted, contrast changes. If contrast is then adjusted, the brightness may be changed again. Accordingly, both brightness and contrast must be independently adjusted in accordance with the judgment of the operator in order to obtain a pleasing picture display. The reason for the change in contrast in response to adjustments of the brightness level, is that the voltage vs. illumination curve of the cathode ray tube is never linear.

Accordingly, it is one object of the present invention to provide an improved method for operating a cathode ray tube and for maintaining substantially constant contrast as necessary adjustments are made in tube brightness.

In order to obtain correct and pleasing picture brightness and contrast, and full picture information in the picture display, it is very desirable to provide various stabilization features in connection with the video signal. This is important for color picture production, and particularly important if actual calibration of color values or contrast values is desired. A system involving cathode ray picture display in which precise calibration is required is exemplified for instance in a co-pending patent application, Ser. No. 453,144, filed May 4, 1965, now Patent 3,351,707, for an Electronic Color Viewer by the inventors of the present invention.

Accordingly, it is another object of the present invention to provide an improved method of controlling the brightness of a cathode ray tube while concurrently controlling contrast, and including stabilization of the video signal.

There are many factors which may cause the brightness of a cathode ray tube to change, usually in a decreasing direction. For instance, the emission of the cathode may decrease due to aging, the efficiency of the phosphor of the tube may decrease, the face plate may become discolored, or the face plate may accumulate dirt. In the case of a color system of the type disclosed in the above-mentioned Patent 3,351,707 involving the use of moving color filters, the color filters may also change in opacity, or may accumulate dirt. Fluctuation in the heater filament voltage can also cause changes in tube brightness.

It is another object of the present invention to provide a method of operating a cathode ray tube which maintains substantially constant brightness, compensating for any visual brightness varying factors, while at the same time maintaining substantially constant contrast.

Another object of the invention is to provide a highly stabilized method for operation of a cathode ray tube in which the D.C. level of the cathode may be held substantially constant and the brightness and contrast may be adjusted substantially independently of the D.C. level of the cathode by adjusting grid voltages in relation to the cathode voltage.

Further objects and advantages of the invention will be apparent from the following description and the accompanying drawings.

In carrying out the objects of the present invention in one preferred form thereof there may be employed a process for controlling the brightness of a picture displayed by a cathode ray tube including the steps of varying the D.C. level of the voltage between the cathode and a first grid to maintain the desired brightness level while inversely varying the D.C. level of the voltage between the cathode and a second grid to thereby maintain a substantially constant picture contrast.

In accordance with the present invention, it has been discovered that the brightness of the picture may be adjusted by variably adjusting the D.C. level of the first grid (usually referred to as the control grid), and the contrast of the picture may be maintained substantially constant during changes in brightness adjustments by inversely varying the voltage on the second grid (normally referred to as the acceleration grid). A very satisfactory result may be obtained merely by making the change in the second grid voltage an inverse linear function of the change in the first grid voltage.

In the accompanying drawings:

FIG. 1 is a curve illustrating a simple relationship between two grid voltages which is maintained in accordance with the method of the present invention to control brightness while maintaining constant contrast of a cathode ray tube.

Figure 2:
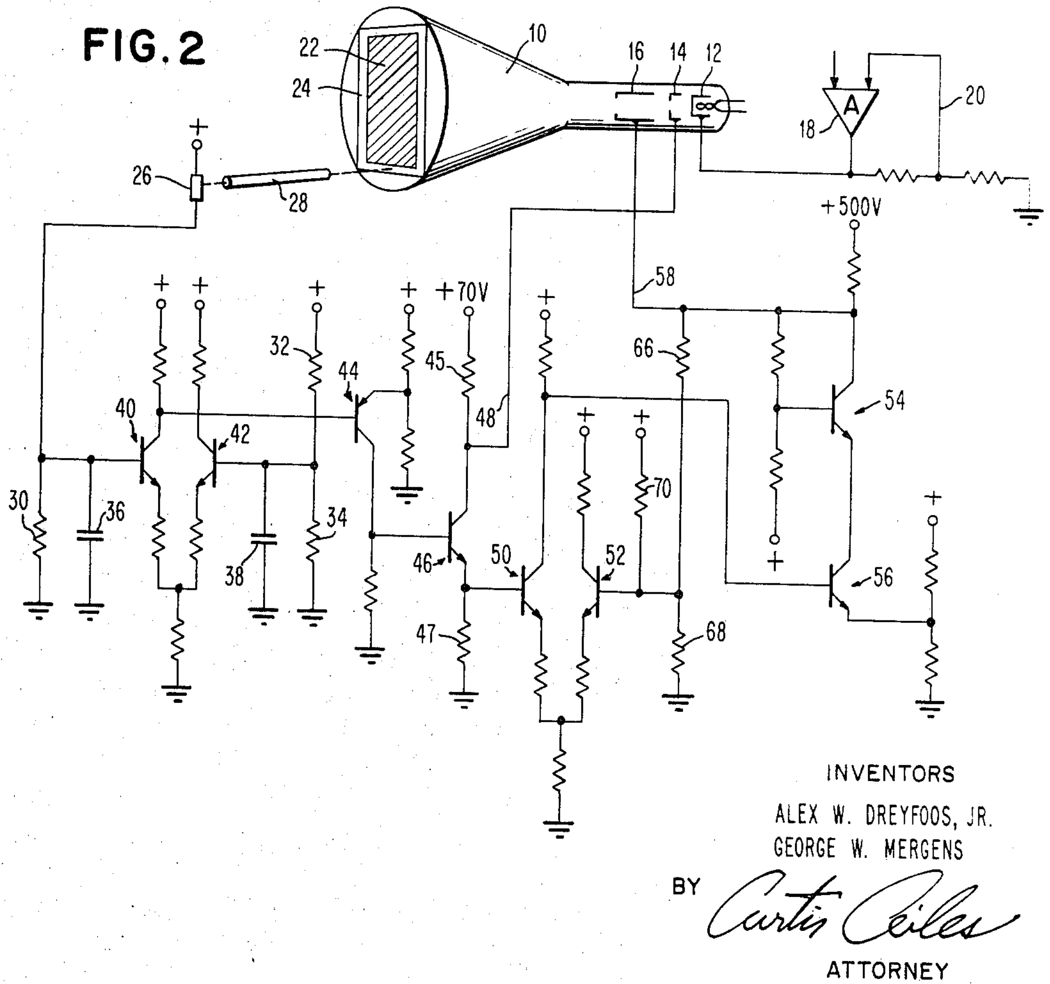

And FIG. 2 is a schematic circuit diagram of a preferred apparatus for carrying out the invention.

A preferred method in accordance with the present invention may be described in more detail in connection with FIG. 1 as follows. The D.C. level of the cathode voltage on the cathode ray tube is preferably stabilized at a substantially constant value. Preferably, the picture displayed includes a completely white area which can be used as a brightness standard. This white area need not be very large, but it may comprise a part of a white border which completely surrounds the picture as it is displayed. With a typical cathode ray tube such as an RCA (Radio Corporation of America) type 8NP4, the cathode may be stabilized at a D.C. level for the white border of about 42 volts, with an anode voltage of 20,000 volts and a filament voltage of 6.3 volts. Voltages are then applied to the first and second grids of the tube which provide the desired brightness and contrast values. Typical voltages for this purpose may be, for instance, 25 volts on the first grid and 210 volts on the second grid. FIG. 1 is a curve showing the desired relationships between the voltage V–14 of the first grid and the voltage V–16 of the second grid. The relationship between the two voltages indicated immediately above is plotted at a point 4 in the curve of FIG. 1. The contrast value may be established by displaying a picture on the cathode ray picture tube which has a known gray area, and adjusting the voltage on the second grid until the gray area has the proper gray tone. An alternating sequence of several adjustments of the first grid and second grid voltages may be necessary in order to obtain the exact brightness and contrast desired.

The filament voltage is now reduced to about sixty percent of the prior value to simulate the effect of drastically decreased cathode emission through aging of the tube, or decreases in tube brightness due to other causes. The voltage of the first grid is then raised to achieve the same brightness as was evident before, while the voltage of the second grid is reduced to maintain the same contrast as was evident before. Several adjustments of each in alternate sequence may be necessary. The newly adjusted voltages of the first and second grid may then be respectively about 41 volts and 98 volts, for instance. These voltage values are recorded and plotted on FIG. 1 at point 6. The two sets of voltage values for the first and second grids, the first set at the normal 6.3 volt filament voltage level, and the second set with the filament voltage reduced, provide a straight-line function indicating the manner in which the first and second grid voltages may be adjusted in relation to one another (to maintain constant contrast with the second grid voltage, while adjusting brightness with the first grid voltage). This function is represented by line 8 plotted through points 4 and 6 in FIG. 1. Thereafter, whenever brightness is adjusted by adjusting the first grid voltage, the contrast is correspondingly adjusted by adjusting the second grid voltage in accordance with the above-mentioned straight line function. Thus, contrast is maintained substantially constant under various brightness control adjustments.

It has been discovered that this straight function line 8 is not identical for each cathode ray tube, even if the cathode ray tubes compared are nominally of the same type and produced by the same manufacturer. Apparently, the factors which are critical in determining the function represented by line 8 in FIG. 1 are not carefully controlled in the manufacture of cathode ray tubes. It is believed that the basic factors in this respect are the physical positions of the grids within the cathode ray tube in relation to the cathode and in relation to one another. Therefore, the function represented by line 8 may vary from one cathode ray tube to another both in the slope and in the terminal points. However, once the function is accurately determined for a particular tube, the performance is consistent for that particular tube, and the contrast is maintained accurately for brightness adjustments by following this function. Actually, a close approximation to an appropriate contrast adjustment for various brightness adjustments is achievable by simply making the determinations described above for points 4 and 6 for a number of different cathode ray tubes, and then by adhering to a function line 8 which is a close approximation to all of the functions so derived. Such a typical function may provide a slope of approximately minus seven.

In this description of the method of this invention, it is assumed that the D.C. level of the video signal applied to the cathode of the picture tube is at a stabilized level. In other words, it is assumed that no brightness control signal is superimposed upon the video signal and applied to the cathode. Such a D.C. stabilized cathode arrangement is preferred in the practice of the method of this invention. However, it will be understood that the D.C. level of the cathode may be adjusted to control brightness if desired, instead of adjusting the D.C. level of the first grid. Alternatively, the D.C. levels of both may be adjusted, so long as the contrast is maintained constant by appropriate adjustment of the second grid voltage in relation to the cathode.

The above method also contemplates that generally the contrast values in the video signal will be stabilized so that adjustments of the contrast accomplished by adjustments of the second grid voltage will have a substantially constant reference.

As previously explained above, it is another feature of the preferred method of the present invention to achieve adjustments of the brightness of the cathode ray tube display so as to maintain such brightness substantially constant in spite of various brightness changing factors. The brightness may be determined visually for the adjustment, or it may be measured by a light meter or other photoresponsive device.

The method of the present invention may be carried out by appropriate manual adjustments of conventional variable voltage sources. However, in accordance with another aspect of the invention, the method is preferably carried out by apparatus specifically designed for the purpose and capable of automatically following the method after the functional relationship between the first grid voltage and the second grid voltage has been determined. Furthermore, it is a feature of the preferred apparatus of the invention to automatically maintain the correct brightness level of the picture, and to automatically maintain the correct contrast while brightness is automatically stabilized.

A preferred apparatus of the invention is illustrated in FIG. 2, and the operation of this apparatus is briefly described as follows:

A cathode ray picture tube 10 is provided with a cathode 12, a first grid 14 and a second grid 16. The cathode 12 is provided with a video signal from an amplifier 18. This amplifier is stabilized by means including a feedback connection schematically indicated at 20.

The pattern of the video signal is such as to display on the face of the tube a picture 22 having a white border area indicated at 24. A photoconductor device 26 is physically positioned and arranged to "look" through a hollow tubular member 28 at a portion of the white border 24. Thus, the photoconductor 26 provides an electrical signal indicative of the brightness of the picture 22 in terms of the brightness of the border 24. Since the border is supposed to be white, this gives a precise brightness signal.

The circuit elements connected to receive the signal from photoconductor 26 provide a voltage to the first grid 14 of the cathode ray tube 10 to maintain the brightness of the display at a substantially constant value. The circuit also automatically maintains a voltage on the second grid 16 which changes in an inverse relationship with respect to any change in the voltage upon the first grid 14. The inverse relationship is such as to maintain a substantially constant contrast of the picture 22 even though wide automatic adjustments of the voltage on the first grid 14 may be necessary to control brightness.

The photoconductor 26 may be regarded as forming a bridge circuit with the resistors 30, 32, and 34. The voltages that are compared in the bridge are respectively stored on capacitors 36 and 38. These two voltages are compared by a differential amplifier including transistors 40 and 42. The output of the differential amplifier as taken at the collector of transistor 40 and applied to the base of an amplifier transistor 44. The output of this stage is further amplified in a transistor amplifier including transistor 46 having collector and emitter load resistors 45 and 47. The output taken at the collector electrode of 46 is supplied through connection 48 to the first grid 14. The operation of this portion of the circuit is such that, whenever the picture brightness is too low, the illumination received by the photoconductor 26 is reduced such that the resultant signal upon grid 14 is caused to increase the picture brightness to a point which balances the differential amplifier including transistors 40 and 42.

The voltage on the emitter of transistor 46 is an inverse function of the voltage on the collector supplied to grid 14. This inverse function voltage is compared with an internal circuit voltage in a differential amplifier including transistors 50 and 52. The differential amplifier output signal from the collector of transistor 50 is amplified in an amplifier stage including transistors 54 and 56. The resultant amplified signal is provided through a connection 58 from the collector electrode of transistor 54 to the second grid 16. The circuitry including transistors 50–56 provides a voltage amplified change in the voltage on the second grid 16 with respect to any corresponding change on control grid 14. Furthermore, this change is inverse to the change in the voltage on the first grid 14. This is preferably the same function as is plotted in FIG. 1. The construction and operation of this portion of the circuit of FIG. 2 is described more fully below.

As explained above, the basic purpose of the photoconductor 26 and the associated circuitry up to the connection 48 to the grid 14 is to achieve an automatic control of picture brightness. Some of the chief factors which can cause changes in picture brightness are factors related to aging. Accordingly, it is quite desirable that the photoconductor 26 itself should not vary substantially in its response to illumination as it ages. Some photoconductor devices are known to change rather drastically in impedance and photoconductivity response as they age. However, others are known to be quite stable over their entire useful life. For this reason, a stable type of photoconductor is required in the present application, and a cadmium sulfide photoconductor is preferred for this purpose because of its stability with aging. The brightness level controlled by the photoconductor 26 is largely determined by the photoconductor impedance characteristic and the circuit constants of the elements of the circuit up to the connection 48. In particular, the relative values of resistors 32 and 34 determine the charge potential on capacitor 38 which in turn determines the balance point of the differential amplifier including transistors 40 and 42. This is obviously a major factor in determining the actual brightness level held by the circuit. If a brightness level adjustment is desired, any of the resistors 30, 32, and 34 may be made adjustable to accomplish this.

For the circuit of FIG. 2, the supply voltage sources may be conventional in construction and are not shown in detail. One terminal of each supply voltage source is connected to ground, as indicated by the conventional ground symbol. The positive connections to supply voltage are indicated in the circuit by a small circle with a plus sign, such as at the upper end of resistor 32, for instance. Where the voltage level of the supply source is not specifically indicated, a typical supply voltage which provides adequate operation is 25 volts. The only exceptions to this in the circuit of FIG. 2 are in the collector circuit of transistor 46, which has a supply voltage of plus 70 volts, and the collector circuit of transistor 54 which is connected to a supply voltage of plus 500 volts.

As previously mentioned above, the portion of the circuit including transistors 50–56 control changes in the voltage on the second grid 16 in response to changes on the first grid 14. The voltage of the emitter of transistor 46, across emitter load resistor 47, is an inverse function of the collector voltage across the collector load resistor 45, which is supplied through connection 48 to the first grid 14. In a practical embodiment, collector resistor 45 may have a resistance value approximately ten times that of emitter resistor 47 so that the inverse variation of the emitter voltage is approximately one-tenth of the corresponding variations of the collector voltage supplied to the first grid 14. The differential amplifier, including transistors 50 and 52 compares the inverse function voltage at the emitter of transistor 46 with a fraction of the voltage on connection 58 supplied to the second grid 16. This fractional voltage is derived by means of a voltage divider including resistors 66 and 68 connected to the base electrode of transistor 52. Another resistor 70 connected to this base electrode must also be considered as basically a part of the lower leg of this voltage divider (connected essentially in parallel with resistor 68). The fraction of the second grid voltage on connection 58 which is compared with the inverse voltage on resistor 47 by means of the differential amplifier of transistors 50 and 52 is equal to the ratio of the value of resistance 68

(taken in parallel with 70) to the total voltage divider resistance including resistors 66 and 68 (with 70 in parallel). In a practical embodiment, this ratio may be in the order of one to seventy. Accordingly, if the voltage across emitter-resistor 47 is approximately one-tenth of the corresponding voltage across the collector load resistor 45, and if the voltage across voltage divider resistor 68 is approximately one-seventieth of the voltage at connection 58, then the ratio of change or slope between the first grid voltage on connection 48 and the second grid voltage on connection 58 is approximately one to seven. As previously stated inversely above, the ratio of change of the second electrode voltage to the first electrode voltage is approximately seven-to-one.

The transistors 54 and 56 simply provide a voltage amplifier, which responds to any unbalance of the differential amplifier including transistors 50 and 52, through the control connection to the base of transistor 56. It is apparent that the feedback connection from this amplifier at its output at 58, through the voltage divider including resistor 66, closes the voltage control loop so as to make the voltage of the second electrode 16 follow the inverse function of the first electrode voltage appearing across the emitter resistor 47.

The voltage divider formed by resistors 70 and 68, taken together with the low voltage source, determine the initial bias voltage on the base electrode of transistor 52. This determines the relative values of the voltages of the second grid and the first grid at an initial point corresponding to the cut off of the feedback loop control of the differential amplifier of transistors 50 and 52 through resistor 66. Thus, for instance, if 25 volts is applied to resistor 70, and if resistor 70 has a resistance value of 800,000 ohms, and resistor 68 has a resistance value of 51,000 ohms, then the minimum voltage at the base of transistor 52 is approximately 1.5 volts. This will correspond to 1.5 volts on the base of transistor 50, and approximately 55 volts on connection 48 at the first grid (70 volts minus a fifteen volt drop across collector-resistor 45). This establishes an initial or "cross-over" point for the voltages on the two grids. This corresponds to the cross-over point of the curve 8 as plotted in FIG. 1 (V–16=0 at V–14=55 volts).

While this invention has been shown and described in connection with preferred embodiments, it is apparent that various changes and modifications, in addition to those mentioned above, may be made by those who are skilled in the art without departing from the basic features of the invention. Accordingly, it is the intention of the applicants to protect all variations and modifications within the true spirit and valid scope of this invention.

What is claimed is:

1. A method for controlling the brightness of a picture displayed by a cathode ray picture tube while maintaining substantially constant picture tube contrast response to video signals comprising the steps of varying the D.C. level of the voltage between the cathode and a first grid to maintain the desired brightness level while inversely varying the D.C. level of the voltage between the cathode and a second grid to thereby maintain a substantially constant picture tube contrast response to video signals.

2. A method as set forth in claim 1 in which the D.C. level of the video signal applied to the cathode of the picture tube is stabilized.

3. A method as set forth in claim 2 in which the contrast values in the video signal are stabilized.

4. A method in accordance with claim 3 in which the brightness of the picture is maintained at a constant value to compensate for aging and filament voltage changes and other factors influencing the brightness of the picture displayed by the picture tube by measuring the illumination from at least a portion of the picture display and by controlling the brightness level in accordance with such measurement to maintain the brightness level at substantially a constant value.

5. A method in accordance with claim 4 in which at least a portion of the picture display includes a white area constantly positioned in the same part of the picture display and in which the measurement of picture brightness is always made with reference to the white area in order to make the measurement independent of the content of the video signal.

6. A method in accordance with claim 5 in which the picture display is provided with a white border, and the white area for measuring picture brightness comprises a part of the white border.

7. Apparatus for carrying out the method of claim 1 comprising means for varying the voltage on said first grid to maintain the desired brightness level, means for generating a voltage which is an inverse function of the voltage supplied to said first grid, a differential amplifier connected to receive said inverse function voltage and to compare said inverse function voltage with a reference voltage and to generate a control signal in response to such comparison, an amplifier connected for operation in response to said control signal for generating a voltage for said second grid, and a feedback connection from the output of said amplifier and effective to modify said reference voltage to thereby cause said second grid voltage and said reference voltage to follow said inverse function voltage.

8. A cathode ray tube brightness and contrast control system comprising means for measuring the picture brightness and for controlling the voltage of the first grid of the cathode ray tube in relation to the cathode thereof to maintain the desired brightness level, means for generating a voltage which is an inverse function of said first grid voltage, and amplifying means operable in response to said inverse function voltage for generating a voltage which varies proportionally to said inverse function voltage for application to the second grid of the cathode ray tube for maintaining constant contrast.

9. A control system in accordance with claim 8 in which said brightness measuring and first grid voltage control means includes a photoconductor, and in which there is provided a bridge circuit having said photoconductor as one of the impedances, a differential amplifier connected to respond to the voltages across said bridge circuit and to thereby respond to changes in the impedance of said photoconductor caused by changes in the illumination thereof, and amplifying means connected for amplifying the differential amplifier output and for supplying said amplified output to the first grid of the cathode ray tube.

10. A system in accordance with claim 9 in which said last-mentioned amplifying means includes means for generating a signal which is a function of the first grid voltage, a second amplifier connected to provide a voltage to said second grid including means to provide a voltage which is a function of the output of said second amplifier, one of said functions of one of said amplifiers being an inverse function, a differential amplifier connected to compare said amplifier functions, and a control connection from the output of said differential amplifier to control the operation of said second amplifier to cause said second amplifier to provide an output for the second grid which is an inverse function of the output of said first amplifier to said first grid.

11. A method in accordance with claim 1 in which the brightness of the picture is maintained at a constant value to compensate for aging and filament voltage changes and other factors influencing the brightness of the picture displayed by the picture tube by measuring the illumination from at least a portion of the picture display and by controlling the brightness level in accordance with such measurement to maintain the brightness level at substantially a constant value.

12. A method in accordance with claim 11 in which at least a portion of the picture display includes a white area constantly positioned in the same part of the picture display and in which the measurement of picture brightness is always made with reference to the white area in order to make the measurement independent of the content of the video signal.

13. A method in accordance with claim 12 in which the picture display is provided with a white border, and the white area for measuring picture brightness comprises a part of the white border.

14. A method in accordance with claim 2 in which the brightness of the picture is maintained at a constant value to compensate for aging and filament voltage changes and other factors influencing the brightness of the picture displayed by the picture tube by measuring the illumination from at least a portion of the picture display and by controlling the brightness level in accordance with such measurement to maintain the brightness level at substantially a constant value.

15. A method in accordance with claim 14 in which at least a portion of the picture display includes a white area constantly positioned in the same part of the picture display and in which the measurement of picture brightness is always made with reference to the white area in order to make the measurement independent of the content of the video signal.

16. A method in accordance with claim 15 in which the picture display is provided with a white border, and the white area for measuring picture brightness comprises a part of the white border.

References Cited

UNITED STATES PATENTS

| | | | |
|---|---|---|---|
| 3,025,345 | 3/1962 | Shurmann | 178—7.5 X |
| 3,072,741 | 1/1963 | Ahrons et al. | 315—22 X |
| 3,112,424 | 11/1963 | Shurmann | 178—7.5 X |
| 3,164,673 | 1/1965 | Sharon | 178—7.5 |
| 3,165,582 | 1/1965 | Korda | 178—7.5 |
| 3,179,743 | 4/1965 | Ahrons et al. | 178—7.5 X |
| 3,214,517 | 10/1965 | Vogt et al. | 178—7.5 |
| 3,240,875 | 3/1966 | Thomas | 178—7.5 |

RODNEY D. BENNETT, Jr., Primary Examiner

JEFFREY P. MORRIS, Assistant Examiner

U.S. Cl. X.R.

178—715